United States Patent
Phan et al.

(10) Patent No.: US 12,173,146 B2
(45) Date of Patent: Dec. 24, 2024

(54) SELF-INVERTING POLYMER EMULSIONS

(71) Applicant: ChampionX LLC, Sugar Land, TX (US)

(72) Inventors: Tri T. Phan, Sugar Land, TX (US); Kerry Charles Brinkman, Naperville, IL (US); Xiaojin Harry Li, Palatine, IL (US); Nicolas J. Leflemme, Aurora, IL (US); Jeremy Moloney, Katy, TX (US); Michael Cash, Richmond, TX (US)

(73) Assignee: ChampionX LLC, Sugar Land, TX (US)

(*) Notice: Subject to any disclaimer, the term of this patent is extended or adjusted under 35 U.S.C. 154(b) by 685 days.

(21) Appl. No.: 16/834,816

(22) Filed: Mar. 30, 2020

(65) Prior Publication Data
US 2020/0308390 A1    Oct. 1, 2020

Related U.S. Application Data

(60) Provisional application No. 62/825,113, filed on Mar. 28, 2019.

(51) Int. Cl.
*C08L 33/10* (2006.01)
*F17D 3/12* (2006.01)

(52) U.S. Cl.
CPC ............ *C08L 33/10* (2013.01); *F17D 3/12* (2013.01); *C08L 2201/52* (2013.01)

(58) Field of Classification Search
CPC ........ C08L 2201/52; C08L 33/10; F17D 1/17; F17D 3/12; C08F 2/30; C09K 2208/28; C09K 8/035
See application file for complete search history.

(56) References Cited

U.S. PATENT DOCUMENTS

| | | | |
|---|---|---|---|
| 2,281,613 A | 5/1942 | Wollthan et al. | |
| 3,542,044 A | 11/1970 | Hansen et al. | |
| 3,624,019 A | 11/1971 | Anderson et al. | |
| 3,654,994 A | 4/1972 | Slagel et al. | |

(Continued)

FOREIGN PATENT DOCUMENTS

| | | | |
|---|---|---|---|
| CN | 101338185 A | 1/2009 | |
| CN | 107011508 A | 8/2017 | |

(Continued)

OTHER PUBLICATIONS

1 International Search Report and Written Opinion dated Jun. 15, 2020 relating to PCT/US2020/025759, 22 pages.

(Continued)

*Primary Examiner* — Latosha Hines
(74) *Attorney, Agent, or Firm* — Stinson LLP (57) ABSTRACT

A polymer composition has been developed that provides low viscosity oil-in-water polymer emulsions that release the polymer in the emulsion at a faster rate and without an additional surfactant when the emulsion is added to a hydrocarbon stream. Use of a temperature-sensitive emulsifying surfactant facilitates inversion of the oil-in-water polymer emulsion when applied to a hydrocarbon composition at a temperature sufficiently high to destabilize the emulsion. These compositions are particularly useful as drag reducers for delivery to a subsea flowline via an umbilical line.

16 Claims, 7 Drawing Sheets

(56) References Cited

U.S. PATENT DOCUMENTS

| | | |
|---|---|---|
| 3,793,218 A | 2/1974 | Canevari |
| 3,857,402 A | 12/1974 | Schuh |
| 4,068,676 A | 1/1978 | Thorn et al. |
| 4,212,312 A | 7/1980 | Titus |
| 4,332,692 A | 6/1982 | Payne et al. |
| 4,881,566 A | 11/1989 | Ubels et al. |
| 5,244,937 A | 9/1993 | Lee et al. |
| 5,539,044 A | 7/1996 | Dindi et al. |
| 7,285,582 B2 | 10/2007 | Harris et al. |
| 7,361,628 B2 | 4/2008 | Milligan et al. |
| 7,468,402 B2 | 12/2008 | Yang et al. |
| 7,598,333 B1 | 10/2009 | Burden et al. |
| 7,884,144 B2 | 2/2011 | Smith et al. |
| 8,022,118 B2 | 9/2011 | Milligan et al. |
| 8,101,045 B2 | 1/2012 | Furman et al. |
| 8,124,673 B2 | 2/2012 | Burden et al. |
| 8,148,303 B2 | 4/2012 | Van Zanten et al. |
| 8,884,049 B2 | 11/2014 | Li et al. |
| 9,193,898 B2 | 11/2015 | Chang et al. |
| 9,290,620 B2 | 3/2016 | Li et al. |
| 9,528,044 B2 | 12/2016 | Van Zanten et al. |
| 9,644,161 B2 | 5/2017 | Kommareddi et al. |
| 9,676,878 B2 | 6/2017 | Bao et al. |
| 9,783,644 B2 | 10/2017 | Burden et al. |
| 9,939,113 B2 | 4/2018 | Olechnowicz et al. |
| 9,982,184 B2 | 5/2018 | Jones |
| 10,053,595 B2 | 8/2018 | Johnston et al. |
| 10,316,118 B2 | 6/2019 | Bao et al. |
| 2002/0173587 A1 | 11/2002 | Lamola et al. |
| 2003/0017953 A1 | 1/2003 | Horton et al. |
| 2005/0049327 A1 | 3/2005 | Jovancicevic et al. |
| 2006/0144595 A1* | 7/2006 | Milligan .......... F17D 1/17 166/305.1 |
| 2006/0148928 A1 | 7/2006 | Harris et al. |
| 2007/0284110 A1 | 12/2007 | Harris et al. |
| 2008/0023071 A1 | 1/2008 | Smith et al. |
| 2009/0111714 A1 | 4/2009 | Burden et al. |
| 2009/0239958 A1 | 9/2009 | Sakanishi et al. |
| 2011/0132466 A1 | 6/2011 | Bucher |
| 2011/0256085 A1 | 10/2011 | Talingting Pabalan et al. |
| 2012/0298209 A1 | 11/2012 | Milligan et al. |
| 2013/0037118 A1 | 2/2013 | Bao et al. |
| 2014/0158360 A1 | 6/2014 | Halliday et al. |
| 2016/0122622 A1* | 5/2016 | Dwarakanath .......... C09K 8/88 507/225 |
| 2016/0281934 A1 | 9/2016 | Olechnowicz et al. |
| 2017/0009027 A1 | 1/2017 | Harris, Jr. et al. |
| 2017/0037299 A1 | 2/2017 | Li et al. |
| 2017/0096597 A1 | 4/2017 | Hu et al. |
| 2017/0121590 A1 | 5/2017 | Lopez et al. |
| 2017/0158947 A1 | 6/2017 | Kim et al. |
| 2018/0002626 A1 | 1/2018 | Potisek et al. |
| 2018/0112126 A1 | 4/2018 | Yang et al. |
| 2018/0305601 A1 | 10/2018 | Champagne et al. |

FOREIGN PATENT DOCUMENTS

| | | |
|---|---|---|
| EP | 2 853 801 A1 | 4/2015 |
| GB | 2 131 067 A | 6/1984 |
| WO | 2012/006781 A1 | 1/2012 |
| WO | WO9101362 A1 * | 1/2012 |
| WO | 2012/067818 A1 | 5/2012 |
| WO | 2016/011106 A1 | 1/2016 |

OTHER PUBLICATIONS

Omer, Ali et al., Effects of Surfactant and Water Concentrations on Pipeline Flow of Emulsions, Industrial & Engineering Chemistry Research, 2013, 52, pp. 9099-9105.

Abdullah, Al-Yaari, Mohammed, Thesis on Influence of Drag Reducing Polymers on Oil-Water Flow Characteristics, King Fahd University of Petroleum & Minerals, Jun. 2008, 137 pages.

Marszall, L., Cloud Point and Emulsion Inversion Point in the Presence of Additives, Journal of Colloid and Interface Science, vol. 59, No. 2, Apr. 1977, 2 pages.

Schott, Hans et al., Effect of Inorganic Additives on Solutions of Nonionic Surfactants, VII. Suspension Stability, Colloids and Surfaces, 19 (1986), pp. 399-418.

Al-Hashmi, A.R. et al., Transportation of heavy oils using polymer-stabilized oil-in-water emulsions, J. Petrol Explor Prod Technol (2017) 7:881-890.

Ramsey, WB, Research Document CAL-2982 (Calgon Corporation), WCL-762 Process Development, Nov. 20, 1975, 16 pages.

Hunter, WE et al., Research Document CAL-2514 (Calgon Corporation), Polymerization of 2-Ethylhexylmethacrylate Oil Soluble Friction Reducer, Apr. 16, 1980, 20 pages.

Farley, DE, Research Document CAL-2983 (Calgon Corporation), Drag Reduction in Nonaqueous Solutions: Structure Property Correlation for Poly(Isodecyl Methacrylate), Date Unknown, 28 pages.

Farley, DE, Research Document CAL-3668 (Calgon Corporation), Progress Report Oil Soluble Gelling Agent, Jan. 6, 1972, 14 pages.

Sherwood, NS, Research Document CAL-3774 (Calgon Corporation), IDMA Copolymers—Oil Friction Reduction, Jan. 12, 1972, 3 pages.

Persinski, LJ, Research Document CAL-3778 (Calgon Corporation), Soloid/Oil-Soluble Friction Reducer, Oct. 28, 1977, 3 pages.

Sherwood, NS, Research Document CAL-3779 (Calgon Corporation), Oil Soluble Friction Reducers, Feb. 10, 1978, 5 pages.

* cited by examiner

SELF-INVERTING POLYMER EMULSIONS

CROSS REFERENCE TO RELATED APPLICATIONS

This application claims priority to U.S. Provisional Patent Application Ser. No. 62/825,113 filed on Mar. 28, 2019, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

A polymer composition has been developed that provides low viscosity oil-in-water polymer emulsions that release the polymer in the emulsion at a faster rate and without an additional surfactant when the emulsion is added to a hydrocarbon stream. Use of a temperature-sensitive emulsifying surfactant facilitates inversion of the oil-in-water polymer emulsion when applied to a hydrocarbon composition at a temperature sufficiently high to destabilize the emulsion. These compositions are particularly useful as drag reducers for delivery to a subsea flowline via an umbilical line.

BACKGROUND OF THE INVENTION

In the subsea production of oil and gas, production piping typically presents a significant bottleneck because of the difficulty and expense associated with the subsea installation of the piping. The production decrease caused by bottlenecking at subsea flowlines can have severe economic ramifications due to the resulting inability to run the hydrocarbon production system at full capacity. Preventing or reducing bottlenecking at subsea flowlines can be affected by increasing the diameter of the flowlines, increasing the number of flowlines, or reducing the amount of friction loss in the flowlines to allow more flow through the same diameter lines. Because of the expense of increasing the size or number of flowlines, it is advantageous to reduce friction losses in subsea flowlines.

It is commonly known that a variety of drag reducers are available for reducing the friction loss of a fluid being transported through a conduit in a turbulent flow regime. Ultra-high molecular weight polymers are known to function well as drag reducers; however, drag reducers vary in their effectiveness. Traditionally, the more effective drag reducing additives have been those containing higher molecular weight polymers. Increasing the molecular weight of the polymer generally increases the percent drag reduction obtained, with the limitation that the polymer must be capable of dissolving in the liquid in which friction loss is affected.

Many offshore oil and gas production facilities are operated from remote locations that can be miles away from the production wells. When remote facilities are used to operate a subsea production facility, an umbilical line can be used to provide power and various flow assurance chemicals to the production facility. These umbilical lines can have many relatively small diameter injection lines where various chemicals can be injected into the flowline at a point near the production wells. These chemicals generally include low viscosity fluids such as hydrate inhibitors, wax inhibitors, and corrosion inhibitors that can help to improve flow conditions in the flowline.

With the constraints of a relatively low viscosity (e.g., less than 500 centipoise) and small particle sizes (e.g., less than 5 microns), a need still exists for effective drag reducers that do not block or plug umbilical lines in the subsea production system.

BRIEF SUMMARY OF THE INVENTION

This disclosure is directed to a polymer composition comprising an oil-in-water emulsion comprising an aqueous phase comprising water and a temperature-sensitive surfactant, and an oil phase comprising a high molecular weight oil-soluble polymer.

The polymer compositions disclosed herein, wherein the composition does not comprise a surfactant having a hydrophilic lipophilic balance (HLB) of less than about 6.

The polymer compositions described herein can have the oil-in-water emulsion invert to release at least 50% of the high molecular weight oil-soluble polymer into a hydrocarbon composition within 60 minutes after contacting the oil-in-water emulsion with the hydrocarbon composition.

The polymer compositions described herein can have the oil-in-water emulsion invert to release the high molecular weight oil-soluble polymer into a hydrocarbon composition resulting in at least 5% drag reduction of the hydrocarbon composition within 15 minutes after contacting the oil-in-water emulsion with the hydrocarbon composition.

The disclosure is also directed to a polymer composition comprising an oil-in-water emulsion; the oil-in-water emulsion comprises an aqueous phase comprising water and a temperature-sensitive surfactant, and an oil phase comprising a high molecular weight oil-soluble polymer. The oil-in-water emulsion can invert to release at least 50% of the high molecular weight oil-soluble polymer into a hydrocarbon composition within 60 minutes after the oil-in-water emulsion contacts the hydrocarbon composition.

The polymer compositions described herein can have at least 60%, at least 70%, at least 80%, at least 90%, at least 95%, or more of the high molecular weight oil-soluble polymer be released into the hydrocarbon composition.

Also, the polymer composition can have the high molecular weight oil-soluble polymer be released into the hydrocarbon composition within 50 minutes, within 40 minutes, within 30 minutes, within 20 minutes, within 10 minutes, within 5 minutes, or less after the oil-in-water emulsion contacts the hydrocarbon composition.

Additionally, the disclosure is directed to a polymer composition comprising an oil-in-water emulsion comprising an aqueous phase comprising water and a temperature-sensitive surfactant, and an oil phase comprising a high molecular weight oil-soluble polymer. The oil-in-water emulsion inverts to release the high molecular weight oil-soluble polymer into a hydrocarbon composition resulting in at least 5% drag reduction of the hydrocarbon composition within 15 minutes after contacting the oil-in-water emulsion with the hydrocarbon composition.

The polymer compositions described herein can have the oil-in-water emulsion invert to release the high molecular weight oil-soluble polymer into a hydrocarbon composition resulting in at least about 10%, 15%, 20%, 25%, 30%, 35%, 40%, or more drag reduction of the hydrocarbon composition.

Additionally, the hydrocarbon composition that the oil-soluble polymer is released into further comprises an aqueous component.

This hydrocarbon composition can comprise at least about 20 wt. % of hydrocarbon based on the total weight of the hydrocarbon composition.

Advantageously, the polymer compositions described herein contain the oil-in-water emulsion that is self-inverting upon contact with the hydrocarbon composition. In other words, the self-inverting oil-in-water emulsion can invert to release the oil-soluble polymer without addition of another surfactant to aid the inversion.

The hydrocarbon composition contacted with the polymer compositions described herein can be recovered from a subterranean hydrocarbon-containing reservoir.

The hydrocarbon composition recovered from the subterranean hydrocarbon-containing reservoir can be a produced fluid comprising at least about 50 wt. % hydrocarbon.

The polymer compositions can have the oil-soluble polymer have a molecular weight of at least 1,000,000 Daltons as measured by gel permeation chromatography (GPC) against a polystyrene standard and preferably, at least about 5,000,000 Daltons.

The polymer compositions advantageously have the oil-in-water emulsion invert to release at least 95% of the high molecular weight oil-soluble polymer into the hydrocarbon composition within 5 minutes, within 3 minutes, or less after contacting the oil-in-water emulsion with the hydrocarbon composition.

Further, the polymer compositions can have the bulk viscosity of the polymer composition before contacting with the hydrocarbon composition be less than about 500 centipoise, less than about 200 centipoise, less than about 100 centipoise, less than about 50 centipoise at a temperature of 20° C. at a polymer concentration of at least 20 wt. %.

Also, the polymer compositions can have the oil-soluble polymer be derived from a monomer comprising an acrylate, a methacrylate, an acrylate ester, a methacrylate ester, styrene, acrylic acid, methacrylic acid, an acrylamide, an alkyl styrene, a styrene sulfonate, a vinyl sulfonate, a 2-acrylamido-2 methylpropane sulfonate, a N-alkyl acrylamide, a N,N-dialkylacrylamide, a N-alkyl methacrylamide, N,N-dialkyl methacrylamide, acrylamide-t-butyl sulfonic acid, acrylamide-t-butyl sulfonate, or a combination thereof. Preferably, the oil-soluble polymer can be derived from a monomer comprising methyl acrylate, methyl methacrylate, ethyl acrylate, ethyl methacrylate, propyl acrylate, propyl methacrylate, butyl acrylate, butyl methacrylate, iso-butyl acrylate, iso-butyl methacrylate, tert-butyl acrylate, tert-butyl methacrylate, pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, iso-octyl acrylate, iso-octyl methacrylate, iso-decyl acrylate, iso-decyl methacrylate, lauryl acrylate, lauryl methacrylate, stearyl acrylate, stearyl methacrylate, behenyl acrylate, behenyl methacrylate, 2-ethylhexyl acrylate, 2-ethylhexyl methacrylate, 2-propylheptyl acrylate, 2-propylheptyl methacrylate, benzyl acrylate, benzyl methacrylate, 2-phenylethyl acrylate, 2-phenylethyl methacrylate, tridecyl acrylate, tridecyl methacrylate, iso-bornyl acrylate, iso-bornyl methacrylate, 3,5,5-trimethylhexyl acrylate, 3,5,5-trimethylhexyl methacrylate, 3,3,5-trimethylcyclohexyl acrylate, 3,3,5-trimethylcyclohexyl methacrylate, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxyethylcaprolactone acrylate, 2-hydroxyethylcaprolactone methacrylate, dihydrodicyclopentadienyl acrylate, dihydrodicyclopentadienyl methacrylate, ethyldiglycol acrylate, ethyldiglycol methacrylate, $C_{17}$ acrylate, $C_{17}$ methacrylate, vinylbenzylpolyoxyethylene alkyl ether, polyoxyethylene alkyl acrylate, polyoxyethylene alkyl methacrylate, or a combination or isomeric form thereof. More preferably, the oil-soluble polymer can be derived from a monomer comprising 2-ethylhexyl methacrylate, 2-ethylhexyl acrylate, or a combination thereof.

Additionally, the polymer composition described herein can have the oil-soluble polymer have a concentration of from about 5 wt. % to about 75 wt. % or from about 20 wt. % to about 50 wt. % in the polymer composition, based on the amount of the oil-soluble polymer, temperature-sensitive surfactant, and water.

The polymer compositions can also have the temperature-sensitive surfactant comprise a nonionic surfactant.

The nonionic surfactant can comprise an alkoxylated alkylphenol, an alkoxylated alcohol, an ethylene oxide/propylene oxide copolymer, or a combination thereof.

Further, the nonionic surfactant can have a cloud point at least 10° C. less, at least 20° C. less, at least 30° C. less, at least 40° C. less, at least 50° C. less, or more than the temperature of the hydrocarbon composition when the cloud point of the nonionic surfactant is measured at a concentration of 1 wt. % in deionized water.

The temperature-sensitive surfactant (e.g., nonionic surfactant) can have a hydrophilic-lipophilic balance (HLB) of greater than 8.

The nonionic surfactant can comprise an ethoxylated octylphenol having an average of 5 to 12 ethylene oxide units per molecule, an ethoxylated nonylphenol having an average of 6 to 13 ethylene oxide units per molecule, an ethoxylated dodecylphenol having an average of 5 to 12 ethylene oxide units per molecule, an ethoxylated linear primary alcohol having an average of 4 to 12 ethylene oxide units per molecule, an ethoxylated branched primary alcohol having an average of 4 to 12 ethylene oxide units per molecule, an ethoxylated linear secondary alcohol having an average of 4 to 12 ethylene oxide units per molecule, and an ethoxylated branched secondary alcohol having an average of 4 to 12 ethylene oxide units per molecule, or a combination thereof.

The temperature-sensitive surfactant can have a cloud point of equal to or less than 100° C., equal to or less than 80° C., equal to or less than 60° C., equal to or less than 50° C., equal to or less than 40° C., equal to or less than 30° C., when the cloud point of the surfactant is measured at a concentration of 1 wt. % in deionized water.

The concentration of the temperature-sensitive surfactant comprises from about 0.5 wt. % to about 16 wt. % from about 1 wt. % to about 8 wt. % of the polymer composition.

The polymer composition can further comprise an alkanolamide dispersant. The alkanolamide dispersant can be a condensation product of a fatty acid and an alkanolamine or an amine-terminated diglycol or polyglycol.

The alkanolamide dispersant can comprise N-hydroxyethyl oleamide, N-(2-hydroxypropyl)oleamide, N-(3-hydroxypropyl)oleamide, N,N-bis(2-hydroxyethyl)oleamide, N,N-bis(2-hydroxypropyl)oleamide, N,N-bis(3-hydroxypropyl)oleamide, N-(2-(2-hydroxyethoxy)ethyl)oleamide, N,N-bis(2-(2-hydroxyethoxy)ethyl)oleamide, or a combination thereof.

Additionally, the alkanolamide dispersant can comprise N,N-bis(2-ethoxyethyl)oleamide.

The concentration of the alkanolamide dispersant can be from about 0.5 wt. % to about 8 wt. % or from about 1 wt. % to about 4 wt. %.

The polymer composition can further comprise a metal salt, an ammonium salt, or a cationic polymer.

The metal salt can comprise salts of cationic species of sodium, potassium calcium, magnesium, aluminum, or a combination thereof.

Preferably, the metal salt can comprise sodium chloride, potassium chloride, calcium chloride, magnesium chloride, aluminum chloride, or a combination thereof.

The concentration of the metal salt can be from about 0.001 wt. % to about 20 wt. % in the composition.

The cationic polymer of the polymer composition can have a molecular weight of from about 200 Daltons to about 1,000,000 Daltons. The cationic polymer can be a polymer derived from epichlorohydrin and dimethylamine, or a polymer derived from monomers of diallyldimethylammonium chloride, 2-trimethylammonium ethyl acrylate chloride, 2-trimethylammonium ethyl methacrylate chloride, N-3-trimethylammonium propyl methacrylamide chloride, or a combination thereof.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION OF THE INVENTION

Polymer compositions are disclosed that can be used in methods of delivering the polymer to various hydrocarbon fluids recovered from a hydrocarbon-containing subterranean formation. The polymer compositions are stable upon transport and storage and in the umbilical line. Stated another way, the polymer compositions described herein contain stable emulsions and the emulsions have an advantageous particle size such that the polymer compositions do not develop a disadvantageous viscosity or precipitate to plug the umbilical line. After being contacted with the hydrocarbon fluid extracted from the hydrocarbon-containing subterranean reservoir, the polymer in the oil-in-water emulsion is released in to the hydrocarbon fluid in a time sufficient to reduce the drag or turbulent forces of the flowing hydrocarbon fluid.

This disclosure is directed to a polymer composition comprising an oil-in-water emulsion comprising an aqueous phase comprising water and a temperature-sensitive surfactant, and an oil phase comprising a high molecular weight oil-soluble polymer.

The polymer compositions can also not comprise a surfactant having a hydrophilic lipophilic balance (HLB) of less than about 6.

Further, the polymer compositions described herein can be substantially free of a surfactant having a hydrophilic lipophilic balance (HLB) of less than about 6. Stated another way, the polymer compositions described herein can have less than an effective amount of a surfactant having a hydrophilic lipophilic balance (HLB) of less than about 6.

Additionally, the polymer compositions described herein can have the surfactant consist essentially of the temperature-sensitive surfactant, wherein the temperature-sensitive surfactant allows the oil-in-water emulsion to self-invert upon contacting a hydrocarbon composition.

The polymer compositions described herein can have the oil-in-water emulsion invert to release at least 50% of the high molecular weight oil-soluble polymer into a hydrocarbon composition within 60 minutes after contacting the oil-in-water emulsion with the hydrocarbon composition.

The polymer compositions described herein can have the oil-in-water emulsion invert to release the high molecular weight oil-soluble polymer into a hydrocarbon composition resulting in at least 5% drag reduction of the hydrocarbon composition within 15 minutes after contacting the oil-in-water emulsion with the hydrocarbon composition.

The disclosure is also directed to a polymer composition comprising an oil-in-water emulsion; the oil-in-water emulsion comprises an aqueous phase comprising water and a temperature-sensitive surfactant, and an oil phase comprising a high molecular weight oil-soluble polymer. The oil-in-water emulsion can invert to release at least 50% of the high molecular weight oil-soluble polymer into a hydrocarbon composition within 60 minutes after the oil-in-water emulsion contacts the hydrocarbon composition.

The polymer compositions described herein can have at least 60%, at least 70%, at least 80%, at least 90%, at least 95%, or more of the high molecular weight oil-soluble polymer be released into the hydrocarbon composition.

Also, the polymer composition can have the high molecular weight oil-soluble polymer be released into the hydrocarbon composition within 50 minutes, within 40 minutes, within 30 minutes, within 20 minutes, within 10 minutes, within 5 minutes, or less after the oil-in-water emulsion contacts the hydrocarbon composition.

Additionally, the disclosure is directed to a polymer composition comprising an oil-in-water emulsion comprising an aqueous phase comprising water and a temperature-sensitive surfactant, and an oil phase comprising a high molecular weight oil-soluble polymer. The oil-in-water emulsion inverts to release the high molecular weight oil-soluble polymer into a hydrocarbon composition resulting in at least 5% drag reduction of the hydrocarbon composition within 15 minutes after contacting the oil-in-water emulsion with the hydrocarbon composition.

The polymer compositions described herein can have the oil-in-water emulsion invert to release the high molecular weight oil-soluble polymer into a hydrocarbon composition resulting in at least about 10%, 15%, 20%, 25%, 30%, 35%, 40%, or more drag reduction of the hydrocarbon composition.

Additionally, the hydrocarbon composition that the oil-soluble polymer is released into can further comprise an aqueous solution. For example, this hydrocarbon composition can be part of a fluid in a hydrocarbon-containing subterranean formation that also contains an aqueous solution.

This hydrocarbon composition can comprise at least about 20 wt. %, 25 wt. %, 30 wt. %, 35 wt. %, 40 wt. % or more of hydrocarbon based on the total weight of the hydrocarbon composition.

Advantageously, the polymer compositions described herein contain the oil-in-water emulsion that is self-inverting upon contact with the hydrocarbon composition. In other words, the self-inverting oil-in-water emulsion can invert to release the oil-soluble polymer without addition of another surfactant to aid the inversion.

The hydrocarbon composition contacted with the polymer compositions described herein can be recovered from a subterranean hydrocarbon-containing reservoir.

The hydrocarbon composition recovered from the subterranean hydrocarbon-containing reservoir can be a produced fluid comprising at least about 50 wt. % hydrocarbon.

The polymer compositions can have the oil-soluble polymer have a molecular weight of from about 1,000,000 Daltons to about 200,000,000 Daltons, from about 2,000,000 Daltons to about 200,000,000 Daltons, from about 3,000,000 Daltons to about 200,000,000 Daltons, from about 4,000,000 Daltons to about 200,000,000 Daltons, from about 5,000,000 Daltons to about 200,000,000 Daltons, from about 1,000,000 Daltons to about 100,000,000 Daltons, from about 2,000,000 Daltons to about 100,000,000 Daltons, from about 3,000,000 Daltons to about 100,000,000 Daltons, from about 4,000,000 Daltons to about 100,000,000 Daltons, from about 5,000,000 Daltons to about 100,000,000 Daltons, from about 1,000,000 Daltons to about 50,000,000 Daltons, from about 2,000,000 Daltons to about 50,000,000 Daltons, from about 3,000,000 Daltons to about 50,000,000 Daltons, from about 4,000,000 Daltons to about 50,000,000 Daltons, or from about 5,000,000 Daltons to about 50,000,000 Daltons as measured by gel permeation chromatography (GPC) against a polystyrene standard.

The polymer compositions advantageously have the oil-in-water emulsion invert to release at least 95% of the high molecular weight oil-soluble polymer into the hydrocarbon composition within 9 minutes, within 8 minutes, within 7 minutes, within 6 minutes, within 5 minutes, within 4 minutes, within 3 minutes, or less after contacting the oil-in-water emulsion with the hydrocarbon composition.

Further, the polymer compositions can have the bulk viscosity of the polymer composition before contacting with the hydrocarbon composition be less than about 500 centipoise, less than about 400 centipoise, less than about 300 centipoise, less than about 200 centipoise, less than about 100 centipoise, less than about 75 centipoise, less than about 50 centipoise at a temperature of 20° C.

The high molecular weight oil-soluble polymers can be prepared using emulsion polymerization of a reaction mixture comprising one or more monomers, a continuous phase, a temperature-sensitive surfactant, and an initiation system. The continuous phase can comprise water, polar organic solvents, or a combination thereof.

In the emulsion polymerization, the polymer compositions can have the oil-soluble polymer be derived from a monomer comprising an acrylate, a methacrylate, an acrylate ester, a methacrylate ester, styrene, acrylic acid, methacrylic acid, an acrylamide, an alkyl styrene, a styrene sulfonate, a vinyl sulfonate, a N-alkyl acrylamide, a N,N-dialkylacrylamide, a N-alkyl methacrylamide, N,N-dialkyl methacrylamide, acrylamide-t-butyl sulfonic acid, acrylamide-t-butyl sulfonate, or a combination thereof.

Preferably, the oil-soluble polymer can be derived from a monomer comprising methyl acrylate, methyl methacrylate, ethyl acrylate, ethyl methacrylate, propyl acrylate, propyl methacrylate, butyl acrylate, butyl methacrylate, iso-butyl acrylate, iso-butyl methacrylate, tert-butyl acrylate, tert-butyl methacrylate, pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, iso-octyl acrylate, iso-octyl methacrylate, iso-decyl acrylate, iso-decyl methacrylate, lauryl acrylate, lauryl methacrylate, stearyl acrylate, stearyl methacrylate, behenyl acrylate, behenyl methacrylate, 2-ethylhexyl acrylate, 2-ethylhexyl methacrylate, 2-propylheptyl acrylate, 2-propylheptyl methacrylate, benzyl acrylate, benzyl methacrylate, 2-phenylethyl acrylate, 2-phenylethyl methacrylate, tridecyl acrylate, tridecyl methacrylate, iso-bornyl acrylate, iso-bornyl methacrylate, 3,5,5-trimethylhexyl acrylate, 3,5,5-trimethylhexyl methacrylate, 3,3,5-trimethylcyclohexyl acrylate, 3,3,5-trimethylcyclohexyl methacrylate, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxyethylcaprolactone acrylate, 2-hydroxyethylcaprolactone methacrylate, dihydrodicyclopentadienyl acrylate, dihydrodicyclopentadienyl methacrylate, ethyldiglycol acrylate, ethyldiglycol methacrylate, $C_{17}$ acrylate, $C_{17}$ methacrylate, vinylbenzylpolyoxyethylene alkyl ether, polyoxyethylene alkyl acrylate, polyoxyethylene alkyl methacrylate, or a combination or isomeric form thereof.

More preferably, the oil-soluble polymer can be derived from a monomer comprising 2-ethylhexyl methacrylate, 2-ethylhexyl acrylate, or a combination thereof.

Additionally, the polymer composition described herein can have the oil-soluble polymer have a concentration of from about 5 wt. % to about 75 wt. %, from about 10 wt. % to about 75 wt. %, from about 15 wt. % to about 75 wt. %, from about 20 wt. % to about 75 wt. %, from about 5 wt. % to about 65 wt. %, from about 10 wt. % to about 65 wt. %, from about 15 wt. % to about 65 wt. %, from about 20 wt. % to about 65 wt. %, from about 5 wt. % to about 55 wt. %, from about 10 wt. % to about 55 wt. %, from about 15 wt. % to about 55 wt. %, from about 20 wt. % to about 55 wt. %, from about 5 wt. % to about 50 wt. %, from about 10 wt. % to about 50 wt. %, from about 15 wt. % to about 50 wt. %, or from about 20 wt. % to about 50 wt. % in the polymer composition, based on the amount of the oil-soluble polymer, temperature-sensitive surfactant, and water.

In the emulsion polymerization process, the polymer compositions can also have the temperature-sensitive surfactant comprise a nonionic surfactant.

The nonionic surfactant can comprise an alkoxylated alkylphenol, an alkoxylated alcohol, an ethylene oxide/propylene oxide copolymer, or a combination thereof.

Preferably, the nonionic surfactant can comprise an ethoxylated octylphenol, an ethoxylated nonylphenol, an ethoxylated branched secondary alcohol, and ethoxylated alkyl alcohol, an ethoxylated/propoxylated alkylphenol, or a combination thereof.

Further, the nonionic surfactant can have a cloud point at least 10° C. less, at least 20° C. less, at least 30° C. less, at least 40° C. less, at least 50° C. less, at least 60° C. less, at least 70° C. less, at least 80° C. less, at least 90° C. less, at least 100° C. less, at least 110° C. less, or more than the temperature of the hydrocarbon composition when the cloud point of the nonionic surfactant is measured at a concentration of 1 wt. % in deionized water.

The temperature-sensitive surfactant (e.g., nonionic surfactant) can have a hydrophilic-lipophilic balance (HLB) of greater than 8, greater than 9, greater than 10, greater than 11, or greater than 12.

The temperature-sensitive surfactant is temperature sensitive in that the surfactant's HLB decreases with increasing temperature since the increase in temperature decreases the affinity of the surfactant molecules and the continuous phase, thus, the surfactants act more hydrophobic at higher temperatures.

The nonionic surfactant can comprise an ethoxylated octylphenol having an average of 5 to 12 ethylene oxide units per molecule, an ethoxylated nonylphenol having an average of 6 to 13 ethylene oxide units per molecule, an ethoxylated dodecylphenol having an average of 5 to 12 ethylene oxide units per molecule, an ethoxylated linear primary alcohol having an average of 4 to 12 ethylene oxide units per molecule, an ethoxylated branched primary alcohol having an average of 4 to 12 ethylene oxide units per molecule, an ethoxylated linear secondary alcohol having an average of 4 to 12 ethylene oxide units per molecule, and an ethoxylated branched secondary alcohol having an average of 4 to 12 ethylene oxide units per molecule, or a combination thereof.

Preferred temperature-sensitive surfactants are disclosed below.

| Name | Structure | EO | HLB | Cloud point (° C.) |
|---|---|---|---|---|
| TRITON ® X-114 | Octylphenol | 7.5 | 12.3 | 22-28 |
| TERGITOL ™ NP-8 | Nonylphenol | 8 | 12.6 | 41-46 |
| TERGITOL ™ NP-9 | Nonylphenol | 9 | 12.9 | 52-56 |
| TERGITOL ™ TMN-6 | Branched secondary alcohol | 8 | 13.1 | 36 |
| MAKON ® DA-6 | Isodecyl alcohol | 6 | 12.0 | 42-44 |
| NOVEL ® 1012-6 | n-decyl/dodecyl alcohol | 6 | 12.4 | 57-60 |
| NOVEL ® TDA-6 | Isotridecyl Alcohol | 6 | 11.3 | 70 |

Preferably, the nonionic surfactant can comprise an ethoxylated octylphenol having an average of 7 to 8 ethylene oxide units per molecule, an ethoxylated nonylphenol having an average of 8 ethylene oxide units per molecule, an ethoxylated branched secondary alcohol having an average of 8 ethylene oxide units per molecule, and ethoxylated isodecyl alcohol having an average of 6 ethylene oxide units per molecule, or a combination thereof.

The temperature-sensitive surfactant can have a cloud point of equal to or less than 100° C., equal to or less than 80° C., equal to or less than 60° C., equal to or less than 50° C., equal to or less than 40° C., equal to or less than 30° C., when the cloud point of the surfactant is measured at a concentration of 1 wt. % in deionized water.

The concentration of the temperature-sensitive surfactant comprises from about 0.5 wt. % to about 16 wt. %, from about 0.75 wt. % to about 16 wt. %, from about 1 wt. % to about 16 wt. %, from about 0.5 wt. % to about 13 wt. %, from about 0.75 wt. % to about 13 wt. %, from about 1 wt. % to about 13 wt. %, from about 0.5 wt. % to about 10 wt. %, from about 0.75 wt. % to about 10 wt. %, from about 1 wt. % to about 10 wt. %, from about 0.5 wt. % to about 8 wt. %, from about 0.75 wt. % to about 8 wt. %, or from about 1 wt. % to about 8 wt. % of the polymer composition.

The polymer composition can further comprise an alkanolamide dispersant. The alkanolamide dispersant can be added during the emulsion polymerization process or after the polymerization process.

The alkanolamide dispersant can be a condensation product of a fatty acid and an alkanolamine or an amine-terminated diglycol or polyglycol.

The alkanolamide dispersant can comprise N-hydroxyethyl oleamide, N-(2-hydroxypropyl)oleamide, N-(3-hydroxypropyl)oleamide, N,N-bis(2-hydroxyethyl)oleamide, N,N-bis(2-hydroxypropyl)oleamide, N,N-bis(3-hydroxypropyl)oleamide, N-(2-(2-hydroxyethoxy)ethyl)oleamide, N,N-bis(2-(2-hydroxyethoxy)ethyl)oleamide, or a combination thereof.

Additionally, the alkanolamide dispersant can comprise N,N-bis(2-ethoxyethyl)oleamide.

The concentration of the alkanolamide dispersant can be from about 0.5 wt. % to about 8 wt. %, from about 0.75 wt. % to about 8 wt. %, from about 1 wt. % to about 8 wt. %, from about 0.5 wt. % to about 6 wt. %, from about 0.75 wt. % to about 6 wt. %, from about 1 wt. % to about 6 wt. %, from about 0.5 wt. % to about 4 wt. %, from about 0.75 wt. % to about 4 wt. %, or from about 1 wt. % to about 4 wt. %.

The polymer composition can further comprise a metal salt, an ammonium salt, or a cationic polymer.

The metal salt can comprise sodium chloride, potassium chloride, calcium chloride, magnesium chloride, aluminum chloride, or a combination thereof.

The concentration of the metal or ammonium salt can be from about 0.001 wt. % to about 20 wt. % in the composition.

The cationic polymer can comprise a polymer derived from epichlorohydrin and dimethylamine, or a polymer derived from monomers of diallyldimethylammonium chloride, 2-trimethylammonium ethyl acrylate chloride, 2-trimethylammonium ethyl methacrylate chloride, N-3-trimethylammonium propyl methacrylamide chloride, or a combination thereof.

The cationic polymer has a molecular weight of from about 200 Daltons to about 1,000,000 Daltons.

The polymer compositions described herein can further comprise an alcohol, a glycol, a glycol, or another solvent that is immiscible with the drag-reducing polymer.

The alcohol can be methanol, ethanol, propanol, isopropanol, butanol, pentanol, alkyl hydroxide, or a combination thereof.

The glycol can be ethylene glycol, propylene glycol, 1,3-propanediol, glycerin, a butanediol, a pentanediol, an alkyl diol, or a combination thereof. Preferably, the polymer composition further comprises ethylene glycol.

The polymer compositions can have the alcohol, glycol, or solvent be present at a concentration from about 0.5 wt. % to about 60 wt. %, from about 0.5 wt. % to about 50 wt. %, from about 0.5 wt. % to about 45 wt. %, from about 0.5 wt. % to about 40 wt. %, from about 0.5 wt. % to about 35 wt. %, from about 0.5 wt. % to about 30 wt. %, from about 5 wt. % to about 60 wt. %, from about 5 wt. % to about 50 wt. %, from about 5 wt. % to about 45 wt. %, from about 5 wt. % to about 40 wt. %, from about 5 wt. % to about 35 wt. %, from about 5 wt. % to about 30 wt. %, from about 10 wt. % to about 60 wt. %, from about 10 wt. % to about 50 wt. %, from about 10 wt. % to about 45 wt. %, from about 10 wt. % to about 40 wt. %, from about 10 wt. % to about 35 wt. %, or from about 10 wt. % to about 30 wt. % of the composition.

The polymer compositions can further comprise a hydrocarbon or other solvent (e.g., silicone oils, fluorosilicone fluids) that is immiscible with the aqueous phase of the emulsion.

The polymer compositions can have the hydrocarbon or other solvent be present at a concentration of from about 0.05 wt. % to about 60 wt. % of the composition, from about 0.05 wt. % to about 40 wt. %, from about 0.05 wt. % to about 20 wt. %, from about 0.05 wt. % to about 10 wt. %, from about 0.05 wt. % to about 5 wt. %, or from about 0.05 wt. % to about 2 wt. %, from about 0.05 wt. % to about 1 wt. %, or from about 0.05 wt. % to about 0.5 wt. %, based on the total weight of the polymer, the continuous phase, and the hydrocarbon.

The polymer compositions disclosed herein can have the hydrocarbon be a paraffinic or cycloaliphatic hydrocarbon containing from 10 to 20 carbon atoms. For example, the hydrocarbons can be kerosene, middle-distillate hydrocarbons, biodiesel, aromatic hydrocarbon oil, substituted cyclopentanes, substituted cyclohexane, substituted cycloheptane, or a combination thereof.

For the other solvent immiscible with the aqueous phase of the emulsion, the silicone oils can include polydimethylsiloxane, and the fluorosilicone fluids can include polymethyl-1,1,1-trifluoropropylsiloxane, or the solvent can be a combination of a silicone oil and a fluorosilicone fluid.

The polymer compositions can further comprise a component that is immiscible in the aqueous phase of the emulsion that is capable of coating the inside of a conduit.

The polymer compositions can have the component that is capable of coating the inside of the conduit inhibits corrosion or reduces the friction of the polymer composition flowing through the conduit. For example, this component can be an oilfield corrosion inhibitor, for example, an N-acyl sarcosine derivative, a 2-mercaptobenzinimidazole alkyl derivative, a thiadiazole alkyl derivative, a thiadiazole alkene derivative, a N-2-hydroxyethyl tall oil imidazoline, a N-2-aminoethyl tall oil imidazoline, a dimer fatty acid, a trimer fatty acid, an alkyl succinic acid, a fatty alkyl trimethylammonium chloride, an alkyl ammonium salt, or a combination there of.

In particular, the component capable of coating the inside of the conduit is a corrosion inhibitor. For example, an alicyclic, aromatic, or aralkyl amine having 6 to 30 carbons, and including, e.g., pyridine and substituted pyridines; an aliphatic amide; an alicyclic amide; an imidazoline; a quaternary ammonium surfactants having an HLB greater than about 9; a phosphate ester such as a $C_2$-$C_{16}$ or $C_8$-$C_{10}$ alkyl phosphate ester including e.g. di-2-ethylhexyl phosphate (di-2-ethylhexyl phosphoric acid), dinonylphosphate, didecylphosphate, mixed phosphate esters, and the like, ethoxylated $C_1$-$C_{12}$ or $C_8$-$C_{10}$ alkylphenol phosphate esters, or other organophosphate esters having a total of 2 to 30 carbons, quinoline, salts thereof, and quaternized derivatives thereof with a $C_1$-$C_{30}$ alkyl halide; a water soluble polymer such as polyethylene oxide or copolymers thereof; a derivative of a carboxylic acid having 6 to 30 carbons, such as a salt or an alkanol ester of $C_1$-$C_{30}$ organic acid; and a mono- or polyunsaturated long-chain acid derived from sources comprising, consisting essentially of, or consisting of tall oil (tall oil fatty acids, or TOFA), coconut oil, canola oil, palm seed oil, and the like obtained as a by-product of the Kraft process of wood pulp manufacture, principally from pulping coniferous trees. The majority component of TOFA (i.e. after purification of crude tall oil) is oleic acid.

The emulsion polymerization can also use a polymer initiation system. For example, the initiation system can generate free radicals that facilitate the emulsion polymerization. The initiators can include persulfates (e.g., ammonium persulfate, sodium persulfate, potassium persulfate), peroxy persulfates, and peroxides (e.g., tert-butyl hydroperoxide) used alone or in combination with a reducing component or accelerator. The reducing components include bisulfites, metabisulfites, ascorbic acid, erythorbic acid, and sodium formaldehyde sulfoxylate. The accelerators can include a composition containing a transition metal with two oxidation states, such as ferrous sulfate and ferrous ammonium sulfate.

Alternatively, known thermal and radiation initiation techniques can be employed to generate the free radicals. Thermal initiators include sodium persulfate (SPS), ammonium persulfate, and potassium persulfate, 2,2'-azobis[2-(2-imidazolin-2-yl)propane]dihydrochloride (VA-044), or a combination thereof.

The oil-in-water emulsion droplets or particles (e.g., colloidal particle size of the polymer) of the oil phase can have a particle size from about 5 nm to about 10 μm, about 5 nm to about 5 μm, from about 5 nm to about 3 μm, from about 5 nm to about 1 μm, from about 5 nm to about 750 nm, from about 5 nm to about 500 nm, from about 5 nm to about 250 nm, from about 25 nm to about 10 μm, from about 25 nm to about 5 μm, from about 25 nm to about 3 μm, from about 25 nm to about 1 μm, from about 25 nm to about 750 nm, from about 25 nm to about 500 nm, from about 25 nm to about 250 nm, from about 50 nm to about 5 μm, from about 50 nm to about 3 μm, from about 50 nm to about 1 μm, from about 50 nm to about 750 nm, from about 50 nm to about 500 nm, or from about 50 nm to about 250 nm. Preferably, the oil-in-water emulsion droplets or particles can have a particle size from about 50 nm to about 250 nm.

Also disclosed is a method of delivering the polymer compositions described herein to the hydrocarbon composition comprising transporting the polymer composition through a fluid conduit having a length of at least about 500 feet, wherein the viscosity of the polymer composition is less than 500 centipoise in the fluid conduit and the oil-soluble polymer begins being released from the emulsion within 30 minutes of contacting the hydrocarbon composition.

The viscosity of the polymer composition can be less than 100 centipoise in the fluid conduit and the oil-soluble polymer begins being released from the emulsion within 5 minutes of contacting the hydrocarbon composition.

Also disclosed are methods of reducing the drag associated with transporting a hydrocarbon fluid through a subsea flowline comprising transporting the polymer compositions through an umbilical line to the subsea flowline and contacting the polymer composition with the hydrocarbon fluid at an injection point.

The amount of the oil-soluble polymer injected into the subsea flowline comprises from about 10 ppm to about 10,000 ppm, from about 10 ppm to about 5,000 ppm, from about 10 ppm to about 1,000 ppm, from about 10 ppm to about 750 ppm, from about 10 ppm to about 500 ppm, from about 25 ppm to about 10,000 ppm, from about 25 ppm to about 5,000 ppm, from about 25 ppm to about 1,000 ppm, from about 25 ppm to about 750 ppm, from about 25 ppm to about 500 ppm, from about 50 ppm to about 10,000 ppm, from about 50 ppm to about 5,000 ppm, from about 50 ppm to about 1,000 ppm, from about 50 ppm to about 750 ppm, or from about 50 ppm to about 500 ppm. Preferably, the amount of the oil-soluble polymer injected into the subsea flowline comprises from about 50 ppm to about 500 ppm based on the total amount of the produced fluid in the flowline.

The polymer compositions can be injected into an umbilical line that is part of an offshore production system. The offshore production system can include a plurality of subsea wellheads, a common production manifold, an offshore platform, a subsea flowline, and an umbilical line. Each wellhead can operate to produce a hydrocarbon-containing fluid from a subterranean hydrocarbon-containing formation. Each wellhead is also connected to the production manifold so that the produced hydrocarbon-containing fluid can flow and be combined with the produced hydrocarbons from other wellheads. The combined produced hydrocarbons can flow from the production manifold to the offshore platform through the subsea flowline. The umbilical line can be connected to a control device on the offshore platform and to either the wellheads, the production manifold, or the subsea flowline.

The length of the umbilical line is typically at least about 500 feet, more typically, at least about 1000 feet, or more.

The polymer compositions have physical properties that allow pumping through an umbilical line long distances at typical operating conditions of from 40° C. to 2° C. and a pressure from atmospheric pressure to 15,000 pounds per square inch (psi).

For the polymer to function as a drag reducer, the high molecular weight oil-soluble polymer is dissolved or substantially (at least 50 wt. % of the polymer) solvated in the produced hydrocarbon fluid.

For the emulsion polymerization, ethylenediamine tetraacetic acid or tetraacetic acid disodium salt is dissolved in deionized (DI) water and an antifoaming agent and a temperature-sensitive surfactant is mixed in a beaker until it is a homogenous mixture. The homogeneous mixture is poured into a nitrogen-purged reactor. Alternatively, these steps could be completed in one reactor using selected addition and appropriate stirring.

The stir speed is set at 200 RPM to 800 RPM and the temperature control to about 21 to 25° C. The monomer (e.g., ethylhexyl methacrylate (EHMA)) is then added to the reactor and the reaction mixture is purged with nitrogen at a sufficient rate to reduce the oxygen concentration to the desired value in the reaction mixture.

After the reaction mixture is purged with nitrogen for 15 to 60 minutes at 21 to 25° C., a sample of the mixture is collected and its density is measured. After the sample is collected, the initiator system is added slowly over 1.5 to 3.5 hours until the conversion of monomer to polymer reaches 95% as determined by the density measurement. This process is followed by increasing the initiator feed rate to 30 times faster for the post-treatment period.

After the initiator addition is completed, the reaction is allowed to continue for another 15 to 45 minutes. The reaction is stopped, the gel number is measured with a 100 mesh filter, the product is filtered, and the final density and RSV at 2000 ppm in kerosene is measured.

Definitions

The percentage of polymer released to a hydrocarbon of a polymer emulsion can be measured by normalizing the maximum drag reduction obtained from a flow loop test of the sample injected in the neat (as-is) form to the maximum drag reduction obtained from a flow loop test at the same testing conditions of the same sample injected in the pre-dissolved (made-down) form. For example, if a polymer emulsion sample injected into a hydrocarbon in its pre-dissolved (make-down) solution gives a maximum drag reduction of 60% and the same sample injected into the same hydrocarbon in its neat (as-is) form gives a maximum drag reduction of 45%, the percentage of polymer released to the hydrocarbon is 75%. The polymer compositions containing the oil-in-water emulsions described herein are substantially stable. The compositions are stable in that they can be stored for a period of time and used as effective drag reducers without further modification. For example, less than 10 wt. %, less than 9 wt. %, less than 8 wt. %, less than 7 wt. %, less than 6 wt. %, less than 5 wt. %, or less of the oil-in-water emulsion particles are dissolved in the continuous phase over a 6 month storage period.

Having described the invention in detail, it will be apparent that modifications and variations are possible without departing from the scope of the invention defined in the appended claims.

EXAMPLES

The following non-limiting examples are provided to further illustrate the present invention.

Example 1: Preparation and Characterization of Polymer Emulsions

For the emulsion polymerization, two initiation systems were used: a redox system, such as sodium metabisulfite (SMBS)/tert-butyl hydroperoxide (TBHP), iron sulfate ($FeSO_4$)/sodium metabisulfite (SMBS)/tert-butyl hydroperoxide (TBHP), disodium hydroxysulfonatoacetate (FF6)/iron sulfate ($FeSO_4$)/ammonium persulfate (APS), or iron sulfate ($FeSO_4$)/sodium persulfate/ammonium persulfate (APS) or a thermal system, such as sodium persulfate (SPS) or 2,2'-azobis[2-(2-imidazolin-2-yl)propane]dihydrochloride (VA-044).

Ethylenediamine tetraacetic acid disodium salt was dissolved in deionized (DI) water and an antifoaming agent and a temperature-sensitive surfactant was mixed in a beaker until it was a homogenous mixture. The homogeneous mixture was poured into a nitrogen-purged reactor. Alternatively, these steps could have been completed in one reactor.

The stir speed was set at 600 RPM and the temperature control to about 25° C. The monomer (e.g., ethylhexyl methacrylate (EHMA)) was then added to the reactor and the reaction mixture was purged with nitrogen at 1 liter/minute (LPM) to reduce the oxygen concentration in the reaction mixture.

After the reaction mixture was purged with nitrogen for 30 minutes at room temperature, a sample of the mixture was collected and its density was measured. After the sample was collected, the initiator system was added slowly over 1.5 to 3.5 hours until the conversion of monomer to polymer reached 95% as determined by the density measurement. The chain transfer agent was then added at 15 minutes after collection of the sample showing 95% conversion. This process was followed by increasing the initiator feed rate to 30 times faster for a post-treatment period.

After the initiator addition was completed, the reaction was allowed to continue for another 30 minutes. The reaction was stopped, the gel number was measured with a 100 mesh filter, the product was filtered, and the final density and RSV at 2000 ppm in kerosene is measured.

The polymer compositions were prepared using the following amounts of reagents.

The molecular weight measured by gel permeation chromatography (GPC) is shown in the following table for Samples E, H, and I.

| Sample | Molecular Weight (Dalton) |
| --- | --- |
| Sample E | 17,000,000 |
| Sample H | 11,000,000 |
| Sample I | 5,800,000 |

Gel permeation chromatography (GPC) Measurements: The following GPC method was used to estimate polymer molecular weight relative to a standard polystyrene latex polymer. The polymer emulsion samples were diluted to 0.05% actives in tetrahydrofuran (THF) and filtered with a 1 μm syringe filter. The samples were then stirred gently for four hours, forming clear, colorless solutions. Chromatography conditions were:

Mobile Phase: THF
Column: Waters Styragel HMW 6E
Standards: Agilent Polystyrene High EasiVials
Flow: 0.5 mL/min
Injection volume: 50 μL For the samples that were made-down, the following procedure was used. 91 grams of kerosene, 3.0 grams of isopropyl alcohol (IPA), and 1.5 grams of Span® 80 was weighed into a tall 300 mL beaker. Mixing was started with an overhead stirrer using a small cage propeller at 800 rpm. 5 grams of the polymer emulsion sample was drawn into a 5 mL disposable syringe and injected into the kerosene solution. Stirring was continued for 15 minutes for complete inversion of the polymer into the kerosene solution. The percentage actives of the make-down polymer in the kerosene solution was calculated based on the actual polymer actives in the polymer emulsion sample. Upon completion of this procedure, 100% of the polymer in the polymer emulsion was dissolved into the kerosene. The make-down (pre-dissolved polymer-in-kerosene) solution was used for flow loop testing to obtain a reference value of 100% polymer in a polymer emulsion released into a hydrocarbon.

| Sample | Temperature-sensitive surfactant | Surfactant Amount (wt %) | Monomer | Monomer Amount (wt %) | Initiator | Initiator Amount (wt %) | Average Particle Size (nm) |
| --- | --- | --- | --- | --- | --- | --- | --- |
| Sample A | TRITON ® X-114 | 4.0 | 2-EHMA | 38.0 | FF6/$FeSO_4$/APS | 0.1/0.0015/0.0025 | 85.6 |
| Sample B | TERGITOL ™ NP-8 | 4.0 | 2-EHMA | 38.0 | VA-044 | 0.0125 | |
| Sample C | TERGITOL ™ NP-9 | 4.0 | 2-EHMA | 38.0 | VA-044 | 0.0125 | |
| Sample D | TERGITOL ™ TMN-6 | 4.0 | 2-EHMA | 38.0 | VA-044 | 0.0125 | |
| Sample E | MAKON ® DA-6 | 4.0 | 2-EHMA | 38.0 | VA-044 | 0.0125 | 87.1 |
| Sample F | TRITON ® X-114 | 2.0 | 2-EHA | 30.0 | FF6/$FeSO_4$/APS | 0.1/0.0015/0.0025 | 133.9 |
| Sample G | TRITON ® X-114 | 4.0 | 2-EHMA | 38.0 | SBMS/TBHP | 0.02/0.002 | |
| Sample H | NOVEL ® TDA-6 | 1.52 | 2-EHA | 31.2 | FF6/$FeSO_4$/APS | 0.1040 | |
| Sample I | NOVEL ® TDA-6 | 1.52 | 2-EHA | 31.2 | FF6/$FeSO_4$/APS | 0.1/0.0015/0.0025 | 160.4 |

That reference value is represented by the maximum drag reduction percentage obtained when the make-down (pre-dissolved) solution was tested in a flow loop run at pre-determined testing conditions. The make-down (pre-dissolved) solution is not intended for applying to a hydrocarbon composition through an umbilical line.

The polymer compositions were also blended with alkanolamide dispersants. For the addition of up to 2 weight percent of an alkanolamine such as N,N-bis(2-hydroxyethyl) oleamide, the neat viscous surfactant was added slowly to the rapidly-stirred emulsion followed by mixing for an additional 30 minutes. For greater than 2% surfactant, an amount of salt, typically 1 to 3 weight percent, was first added to the rapidly-stirred emulsion in one charge. The salt dissolved rapidly and helped reduce the viscosity increase of the emulsion when a larger amount of alkanolamide dispersant was added. Water can also be added to reduce the emulsion viscosity if it is above a desired target value.

Torque monitor test: This test was used to evaluate self-inversion of the polymer emulsions. Torque monitor tests were performed using the torque monitor setup, including a 2.5" wide×3" high flat stir paddle, an Ace 600 mL jacketed beaker, and a circulating water bath that permitted inversion at constant temperatures. Tests were performed with 200 g of either kerosene or a paraffinic oil and with 5 g of emulsion polymer. The polymer solution was mixed at 500 rpm for 60 minutes while the motor torque was recorded. Tests were conducted between 40° C. and 80° C. An increase in the motor torque after the polymer was added to the oil indicated that the polymer composition self-inverted.

Drag reduction flow loop test: Effectiveness of the polymer emulsions in reducing pressure loss in a pipe was evaluated using a flowloop of stainless-steel pipe (0.834-inch ID). The loop contained a low shear, variable speed pump, a mass flow meter to control flow rate, a chiller to maintain a constant temperature, and a chemical injection pump to inject the polymer emulsions. All flow loop tests were performed with 60 ppm polymer in kerosene circulated through the loop at a fixed flow rate of 40 KG/minute and at a test temperature of 60° C. A differential pressure transducer was used to monitor pressure drop along a 7-foot long test section. Drag reduction along the test section was calculated as follows:

$$\% \text{ Drag reduction} = \frac{P_0 - P_t}{P_0}$$

where:
% Drag reduction=% pressure loss reduction
$P_0$=pressure loss before chemical was injected and
$P_1$=pressure loss at time t after chemical was injected.

The maximum drag reduction and percentage of polymer released to hydrocarbon from Samples A, E, and F are in the following table.

| Sample | Maximum drag reduction by make-down solution (% DR) | Maximum drag reduction by neat polymer emulsion (% DR) | Time reached maximum drag reduction by neat polymer emulsion (minutes after injection) | % of polymer released into hydrocarbon |
|---|---|---|---|---|
| Sample A | 67.9 | 51.4 | 3.92 | 75.7 |
| Sample E | 54.9 | 47.3 | 1.65 | 86.2 |
| Sample F | 33.0 | 32.1 | 1.43 | 97.2 |

Figure 1:
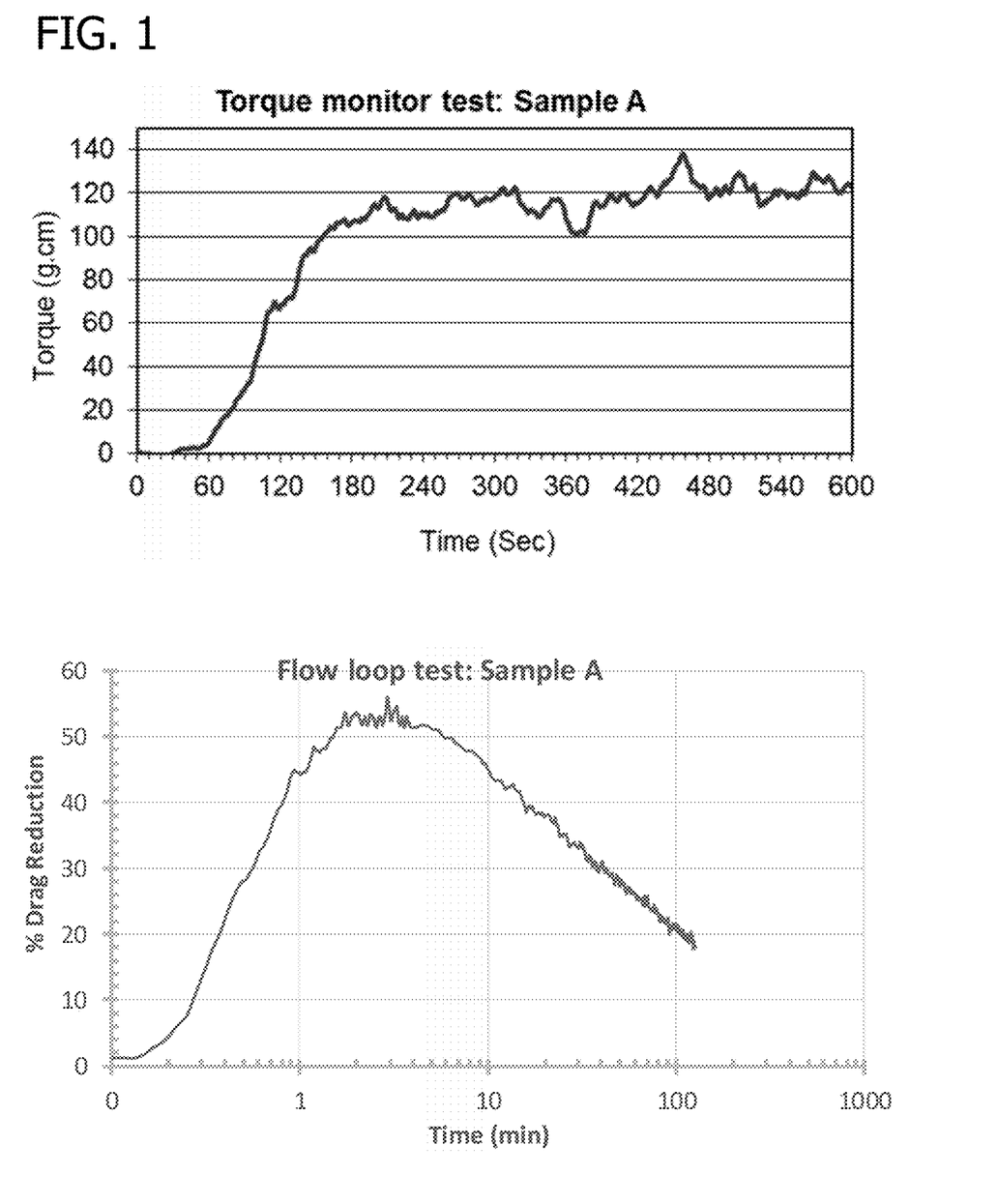
FIG. 1 shows a graph of the torque (g·cm) versus the time (sec) (at 80° C., paraffinic oil) and graph of the % drag reduction versus time in a flow loop test (at 60° C., kerosene) for Sample A, a polymer emulsion comprising a 2-ethylhexylmethacrylamide polymer made with an ethoxylated octylphenol surfactant of TRITON® X-114 (cloud point: 22-28° C.).
Figure 2:
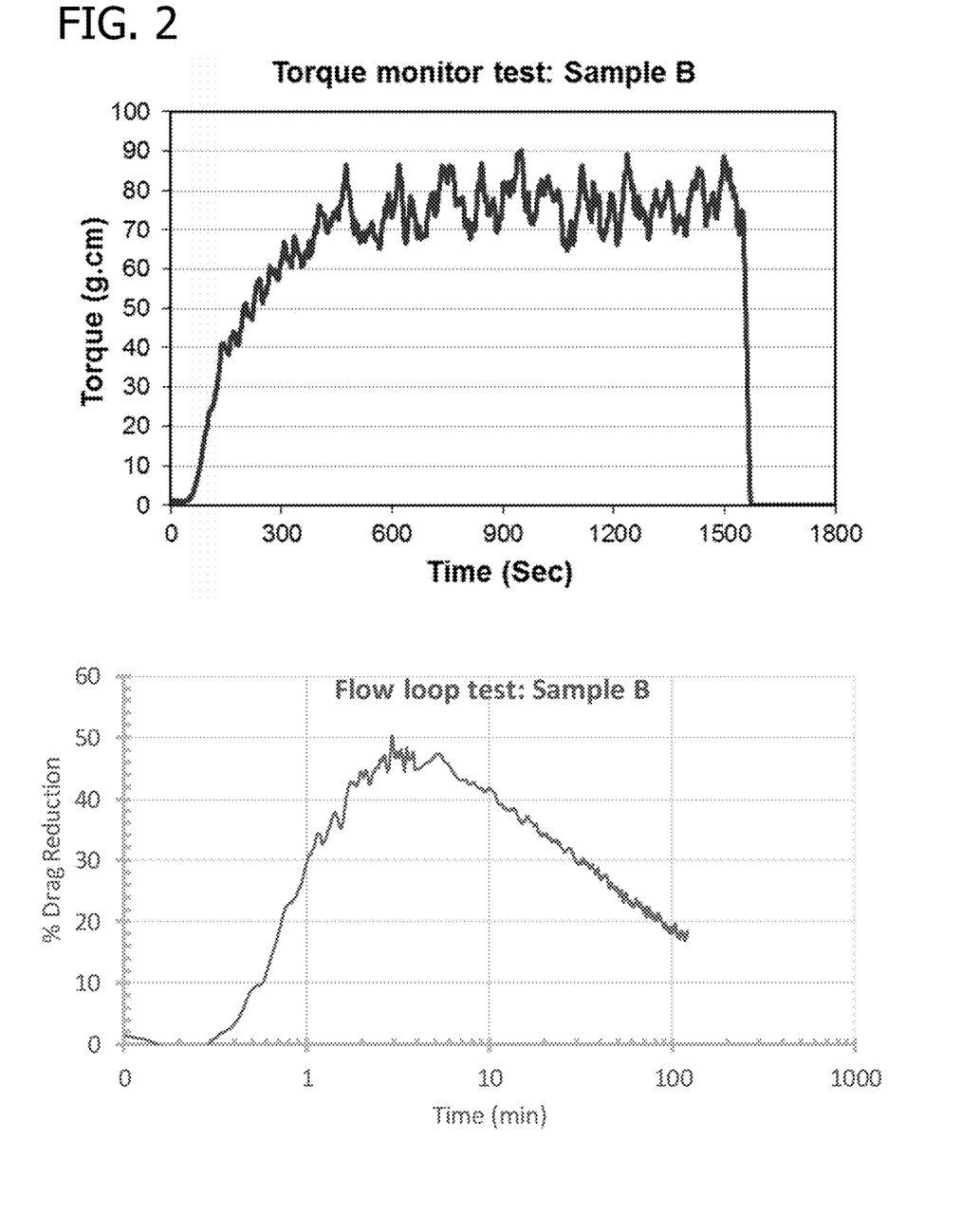
FIG. 2 shows graphs of the torque (g·cm) versus the time (sec) (at 80° C., paraffinic oil) and a graph of the % drag reduction versus time in a flow loop test (at 60° C., kerosene) for Sample B, a polymer emulsion comprising a 2-ethylhexylmethacrylamide polymer made with an ethoxylated nonylphenol surfactant of TERGITOL™ NP-8 (cloud point: 41-46° C.).
Figure 3:
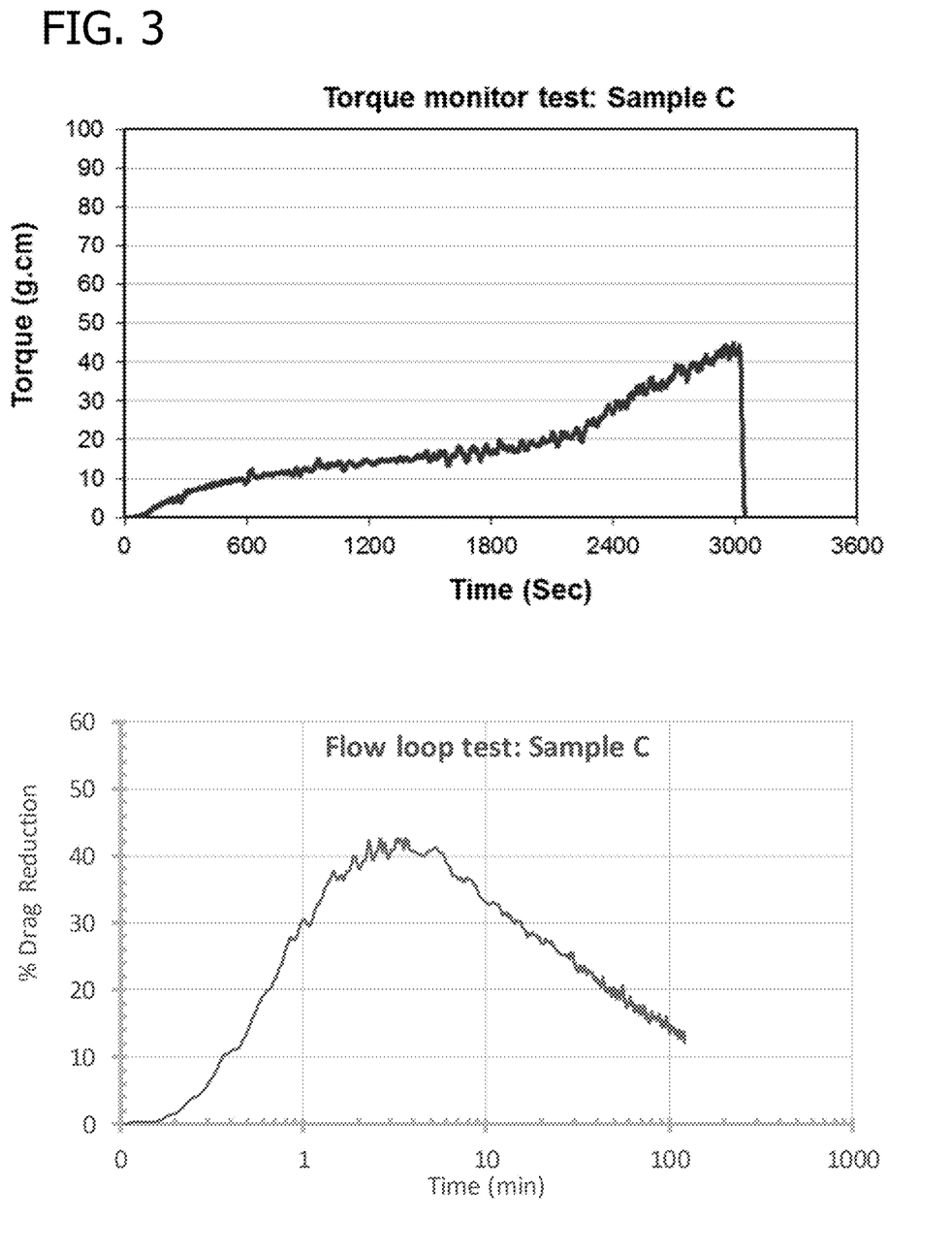
FIG. 3 shows graphs of the torque (g·cm) versus the time (sec) (at 80° C., paraffinic oil) and a graph of the % drag reduction versus time in a flow loop test (at 60° C., kerosene) for Sample C, a polymer emulsion comprising a 2-ethylhexylmethacrylamide polymer and made with an ethoxylated nonylphenol surfactant of TERGITOL™ NP-9 (cloud point: 52-56° C.).
Figure 4:
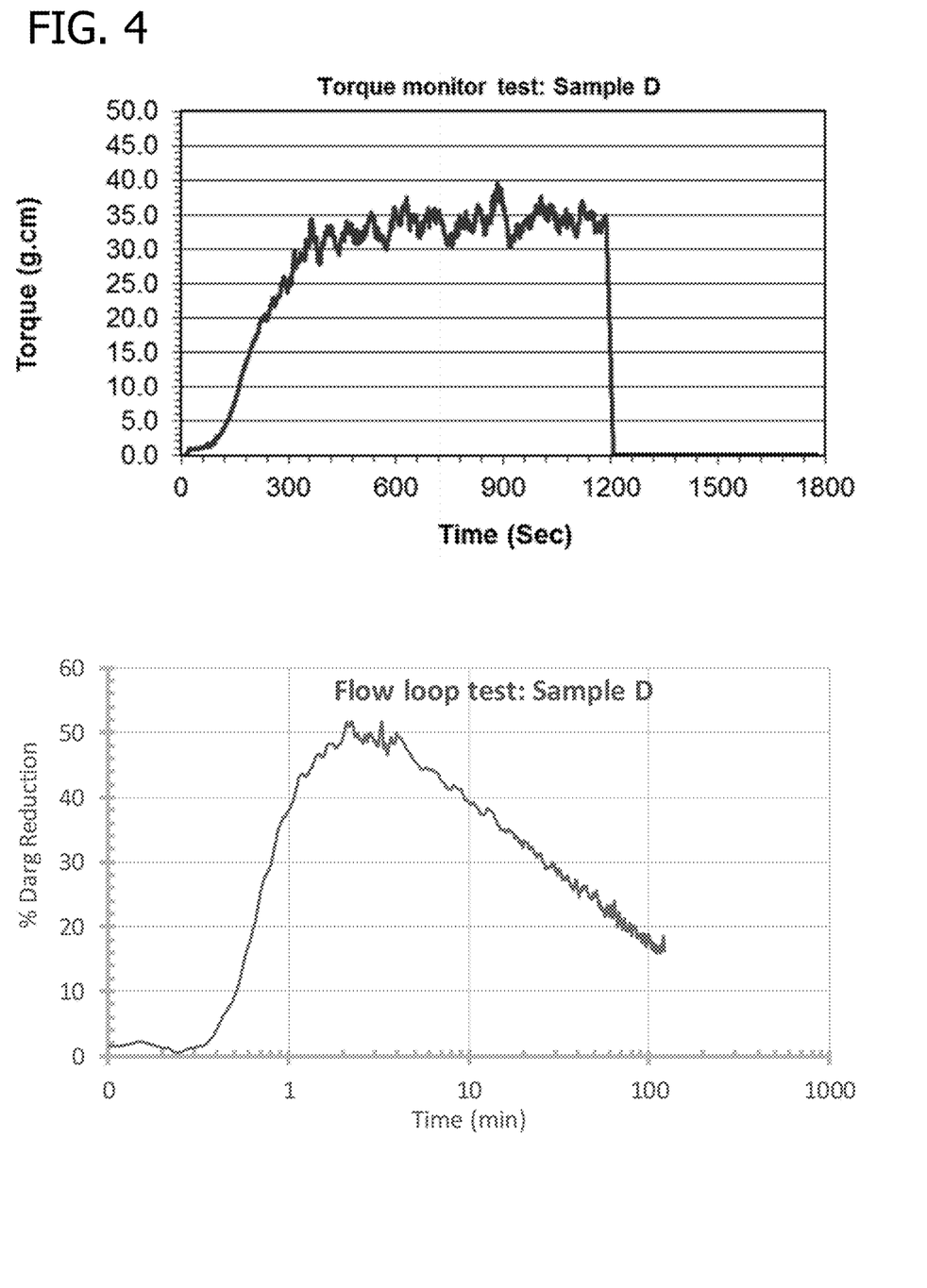
FIG. 4 shows graphs of the torque (g·cm) versus the time (sec) (at 80° C., paraffinic oil) and a graph of the % drag reduction versus time in a flow loop test (at 60° C., kerosene) for Sample D, a polymer emulsion comprising a 2-ethylhexylmethacrylamide polymer and made with an ethoxylated branched secondary alcohol surfactant of TERGITOL™ N-6 (cloud point: 36° C.).
Figure 5:
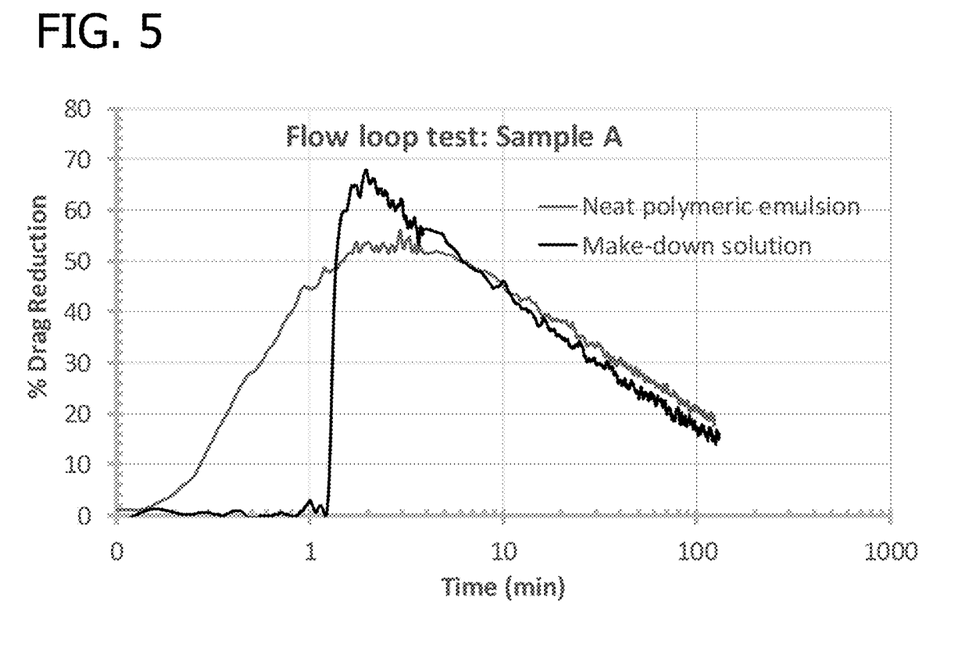
FIG. 5 shows a graph of the % drag reduction versus time in a flow loop test (at 60° C., kerosene) of neat polymer emulsion and a make-down solution of Sample A, a polymer emulsion comprising a 2-ethylhexylmethacrylamide polymer made with an ethoxylated octylphenol surfactant of TRITON® X-114 (cloud point: 22-28° C.).
Figure 6:
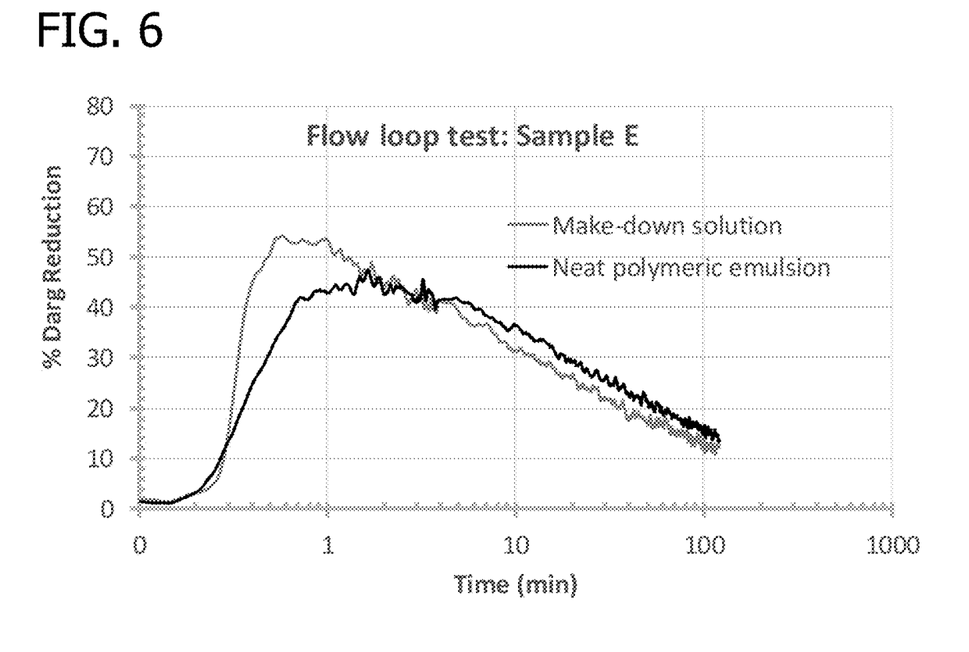
FIG. 6 shows a graph of the % drag reduction versus time in a flow loop test (at 60° C., kerosene) of neat polymer emulsion and a make-down solution of Sample E, a polymer emulsion comprising a 2-ethylhexylmethacrylamide polymer and made with an ethoxylated isodecyl alcohol surfactant of MAKON® DA-6 (cloud point: 42-44° C.).
Figure 7:
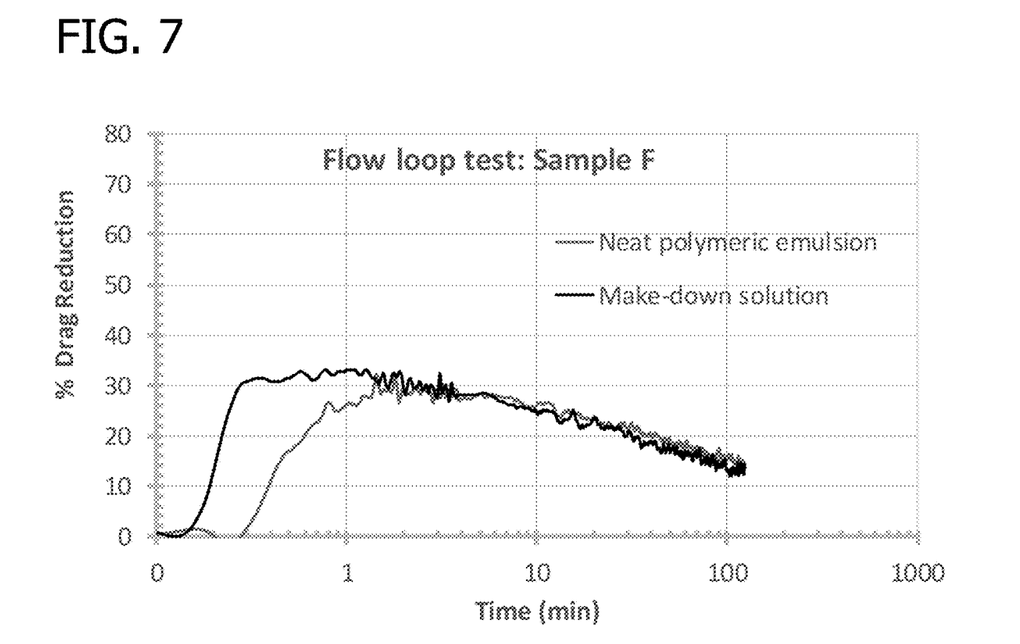
FIG. 7 shows a graph of the % drag reduction versus time in a flow loop test (at 60° C., kerosene) of neat polymer emulsion and a make-down solution of Sample F, a polymer emulsion comprising a 2-ethylhexylmethacrylamide polymer made with an ethoxylated octylphenol surfactant of TRITON® X-114 (cloud point: 22-28° C.) blended with 4% alkanolamide.
Figure 8:
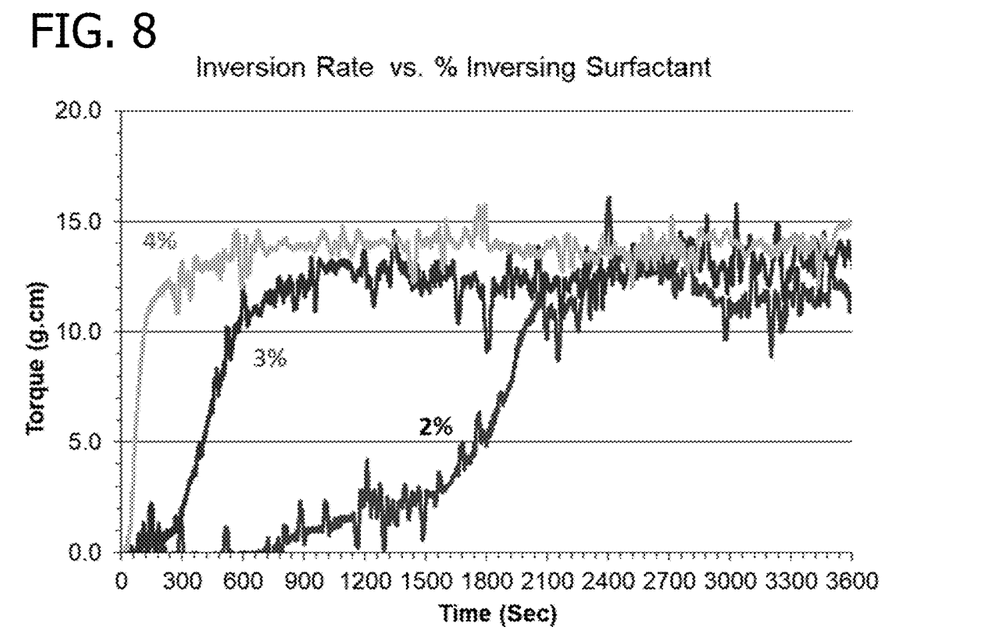
FIG. 8 is a graph of the torque (g·cm) versus the time (sec) for Sample F, a polymer emulsion comprising a 2-ethylhexylmethacrylamide polymer and made with 4% of a TRITON® X-114 surfactant blended with 2, 3, and 4% alkanolamide and self-inverted into kerosene at 60° C. with stirring at 500 rpm with a flat paddle.
Figure 9:
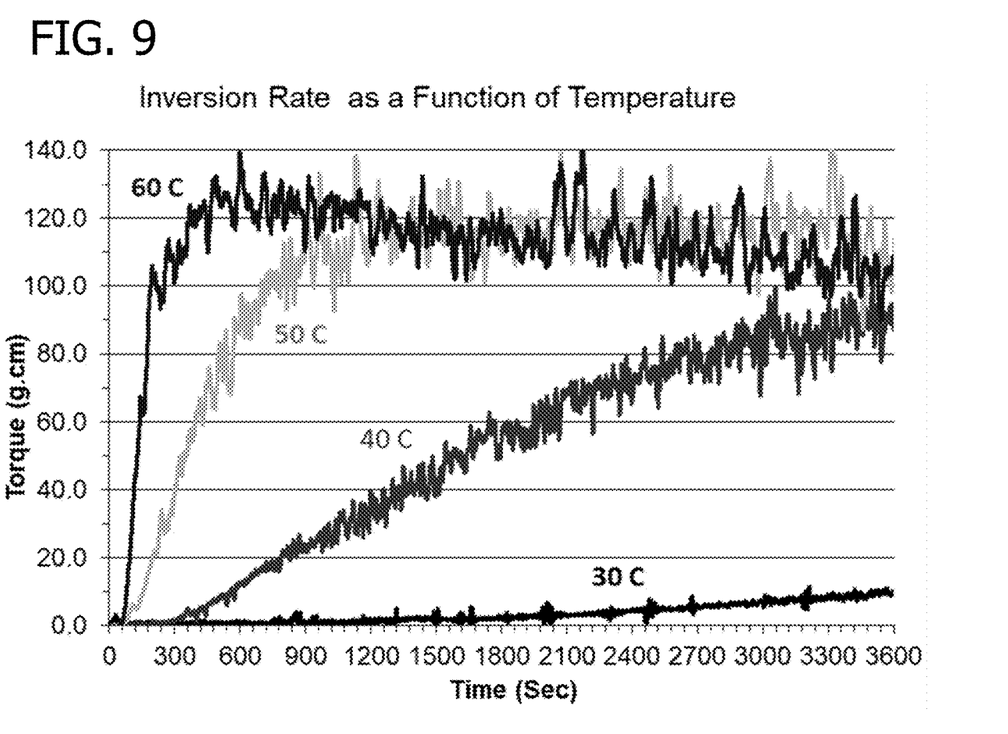
FIG. 9 is a graph of the torque (g·cm) versus the time (sec) for Sample G, a polymer emulsion comprising a 2-ethylhexylmethacrylamide polymer and made with 4% of a TRITON® X-114 surfactant blended with 4% alkanolamide and 2% sodium chloride and self-inverted into kerosene at 60° C. with stirring at 500 rpm with a flat paddle.

The torque monitor test and flow loop test results for various samples are shown in FIGS. 1-9.

Example 2: Polymer Compositions Comprising a Glycol

Sample U was prepared using the procedure described in Example 1 wherein the ethylene glycol was added following water addition and the reactants were added in the concentrations detailed in the table below.

| Sample | Temperature-sensitive surfactant | Surfactant Amount (wt %) | Monomer | Monomer Amount (wt %) | Initiator | Initiator Amount (wt %) | Ethylene glycol (wt. %) |
|---|---|---|---|---|---|---|---|
| Sample U | TRITON ® X-114/Stepan Steol CS330 | 4.0/3.0 | 2-EHMA | 38.0 | SBMS/TBHP | 0.24/0.002 | 28.49 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

The invention claimed is:

1. A polymer composition comprising:
an oil-in-water emulsion comprising an aqueous phase comprising water and a temperature-sensitive surfactant, and an oil phase comprising a high molecular weight oil-soluble polymer;
wherein the high molecular weight oil-soluble polymer is derived from a monomer comprising 2-ethylhexyl methacrylate, 2-ethylhexyl acrylate, or a combination thereof and has a molecular weight of from about 5,000,000 Daltons to about 50,000,000 Daltons as measured by gel permeation chromatograph (GPC) as compared to a polystyrene standard;
wherein the temperature-sensitive surfactant is a nonionic surfactant having a cloud point of equal to or less than 80° C. at a concentration of 1 wt. % actives and a hydrophilic lipophilic balance (HLB) of greater than 8;
wherein the polymer composition is free of a surfactant having a hydrophilic lipophilic balance (HLB) of less than about 6; and
wherein the oil-in-water emulsion inverts to release the high molecular weight oil-soluble polymer into a hydrocarbon composition resulting in at least 10% drag reduction of the hydrocarbon composition within 15 minutes after contacting the oil-in-water emulsion with the hydrocarbon composition.

2. The polymer composition of claim 1, wherein the oil-in-water emulsion inverts to release the high molecular weight oil-soluble polymer into a hydrocarbon composition resulting in at least 20% drag reduction of the hydrocarbon composition within 15 minutes after contacting the oil-in-water emulsion with the hydrocarbon composition.

3. The polymer composition of claim 1, wherein the oil-in-water emulsion inverts to release at least 50% of the high molecular weight oil-soluble polymer into the hydrocarbon composition within 20 minutes after contacting the oil-in-water emulsion with the hydrocarbon composition.

4. The polymer composition of claim 2, wherein the oil-in-water emulsion inverts to release the high molecular weight oil-soluble polymer into a hydrocarbon composition resulting in at least 30% drag reduction of the hydrocarbon composition.

5. The polymer composition of claim 1, wherein the oil-in-water emulsion is self-inverting upon contact with the hydrocarbon composition.

6. The polymer composition of claim 1, wherein the hydrocarbon composition is recovered from a subterranean hydrocarbon-containing reservoir.

7. The polymer composition of claim 1, wherein the oil-soluble polymer has a concentration of from about 20 wt. % to about 50 wt. % in the polymer composition.

8. The polymer composition of claim 1, wherein the temperature-sensitive surfactant comprises a nonionic surfactant, wherein the nonionic surfactant comprises an alkoxylated alkylphenol, an alkoxylated alcohol, an ethylene oxide/propylene oxide copolymer, or a combination thereof.

9. The polymer composition of claim 8, wherein the nonionic surfactant has a cloud point at least 20° C. less than the temperature of the hydrocarbon composition.

10. The polymer composition of claim 8, wherein the nonionic surfactant comprises an ethoxylated octylphenol having an average of 5 to 10 ethylene oxide units per molecule, an ethoxylated nonylphenol having an average of 6 to 12 ethylene oxide units per molecule, an ethoxylated branched secondary alcohol having an average of 6 to 10 ethylene oxide units per molecule, and ethoxylated isodecyl alcohol having an average of 4 to 8 ethylene oxide units per molecule, or a combination thereof.

11. The polymer composition of claim 1, wherein the concentration of the temperature-sensitive surfactant comprises from about 0.5 wt. % to about 16 wt. % of the polymer composition.

12. A method of delivering the polymer composition of claim 1 to a hydrocarbon composition recovered from a hydrocarbon-containing subterranean formation comprising transporting the polymer composition through a fluid conduit having a length of at least about 500 feet, wherein the viscosity of the polymer composition is less than 500 centipoise in the fluid conduit and the oil-soluble polymer begins being released from the emulsion within 30 minutes of contacting the hydrocarbon composition.

13. The method of claim 12, wherein the viscosity of the polymer composition is less than 100 centipoise in the fluid conduit and the oil-soluble polymer begins being released from the emulsion within 5 minutes of contacting the hydrocarbon composition.

14. A method of reducing the drag associated with transporting a hydrocarbon fluid through a subsea flowline comprising transporting the polymer composition of claim 1 through an umbilical line to the subsea flowline and contacting the polymer composition with the hydrocarbon fluid at an injection point.

15. The polymer composition of claim 1, wherein the nonionic surfactant has a cloud point of equal to or less than 40° C.

16. The polymer composition of claim 1, wherein the nonionic surfactant has a cloud point of equal to or less than 30° C.

* * * * *